(12) United States Patent
Roth

(10) Patent No.: US 6,387,426 B1
(45) Date of Patent: May 14, 2002

(54) METHOD FOR TREATING MEAT PRODUCTS WITH AMMONIA

(76) Inventor: Eldon Roth, 891 Two Rivers Dr., Dakota Dunes, SD (US) 57049

(*) Notice: Subject to any disclaimer, the term of this patent is extended or adjusted under 35 U.S.C. 154(b) by 0 days.

(21) Appl. No.: 09/685,352

(22) Filed: Oct. 10, 2000

Related U.S. Application Data

(63) Continuation-in-part of application No. 09/286,699, filed on Apr. 6, 1999, now Pat. No. 6,142,067.

(51) Int. Cl.⁷ .............................. A23B 4/16; A23L 1/31; A23L 1/317
(52) U.S. Cl. ........................ 426/319; 426/331; 426/335; 426/641; 426/646
(58) Field of Search ................................ 426/319, 331, 426/335, 641, 646

(56) References Cited

U.S. PATENT DOCUMENTS

| | | | |
|---|---|---|---|
| 3,023,109 A | 2/1962 | Hines | |
| 5,077,009 A | 12/1991 | Subotics et al. | 422/40 |
| 5,082,679 A | 1/1992 | Chapman | 426/312 |
| 5,433,142 A | 7/1995 | Roth | 99/474 |
| 5,871,795 A | 2/1999 | Roth | 426/319 |

FOREIGN PATENT DOCUMENTS

| | | | | |
|---|---|---|---|---|
| JP | 64-39965 | * | 2/1989 | 426/319 |
| SU | 2081186/13 | | 12/1976 | |

* cited by examiner

*Primary Examiner*—Arthur L. Corbin
(74) *Attorney, Agent, or Firm*—Russell D. Culbertson; Shaffer & Culbertson, LLP

(57) ABSTRACT

Ammonia is first applied to a meat product to produce an ammoniated meat product. The ammoniated meat product is then contained in a treatment vessel in a treatment gas atmosphere substantially free of ammonia gas. Once the ammoniated meat product is contained in the appropriate atmosphere, the treatment method includes increasing the pressure in the treatment vessel to an operating pressure greater than the vapor pressure of ammonia at the temperature of the ammoniated meat product being treated. The operating pressure is held within the treatment vessel for an operating period effective to reduce the amount of ammonia gas which escapes from the meat product after the product is placed again under atmospheric conditions.

20 Claims, 3 Drawing Sheets

METHOD FOR TREATING MEAT PRODUCTS WITH AMMONIA

CROSS-REFERENCE TO RELATED APPLICATION

The present application is a continuation-in-part of U.S. patent application Ser. No. 09/286,699, filed on Apr. 6, 1999 entitled APPARATUS AND METHOD FOR TREATING AMMONIATED MEATS, now U.S. Pat. No. 6,142,067. The Applicant hereby claims the benefit of this earlier application under 35 U.S.C. §120. The entire content of this earlier-filed application is incorporated in this document by this reference.

TECHNICAL FIELD OF THE INVENTION

The invention relates to meat processing. More particularly, the invention relates to an apparatus and process for treating meat products with ammonia.

BACKGROUND OF THE INVENTION

Meat products are subject to contamination with certain dangerous microorganisms such as various strains of *E. Coli* bacteria, for example. Although with careful handling and processing it is possible to reduce the risk of contamination, there is always the possibility that undesirable microorganisms will come into contact with a meat product in the course of processing. Once a meat product is contaminated with a dangerous microorganism, the microorganism may, depending upon handling and conditions, multiply and reach dangerous levels in the meat product. Also, the dangerous microorganisms present on the contaminated meat product may be distributed to surrounding meat products in the course of further processing and storage.

Numerous techniques have been developed for killing or otherwise eliminating dangerous microorganisms which may be found in meat products. Other techniques focus on controlling the growth of microorganisms in the meat products. For example, heat sterilization may be used to kill microorganisms in meat products. However, heat sterilization affects the nature of the meat product. Also, the cooked or partially cooked meat product may again support rapid growth of dangerous microorganisms which may come in contact with the meat product after heat sterilization. In addition to heat sterilization, chemical preservatives may be added to control the growth of microorganisms in cooked, uncooked, or partially cooked meat products. Another sterilization technique includes bombarding the meat product with various types of electromagnetic radiation to kill microorganisms which may be present in the meat product. All of the above-described microorganism control or sterilization techniques are associated with undesirable side effects or other problems which have prevented their acceptance throughout the meat processing industry.

U.S. Pat. No. 5,871,795, to the inventor of the present invention, discloses a method and apparatus for modifying the pH of a meat using ammonia. The application of ammonia according to that patent reduces the levels of certain dangerous microorganisms immediately after treatment and also controls the growth of dangerous microorganisms in the meat product as it is stored after treatment. In U.S. Pat. No. 5,871,795 the meat is compressed in contact with ammonia gas to an operating pressure for a short period of time. This operating pressure comprises a pressure greater than the vapor pressure of ammonia at the temperature of the meat product being processed. The purpose of applying the ammonia gas under pressure is to quickly increase the pH of the foodstuff without having to expose the meat product to ammonia for an extended period of time. It has been found that extended exposure to ammonia may adversely affect certain properties of a meat product. In particular, exposing a meat product to ammonia for an extended period of time may cause the meat product to produce an undesirable ammonia odor after treatment.

Prior related U.S. patent application Ser. No. 09/286,699, now U.S. Pat. No. 6,142,067, discloses an apparatus and method for treating an ammoniated meat. The object of that invention is to prevent the ammonia previously added to the meat from affecting the taste or smell of the meat product, while raising the pH of the meat product consistently throughout the material. This prior treatment system requires comminuting the meat and is thus suited only for products such as ground meats and other comminuted meat products.

There remains a need for an arrangement for applying ammonia to meats, particular whole or noncomminuted meats, so as to produce the desired pH change in the meat product without leaving the meat product with an undesirable ammonia odor or undesirable flavor.

SUMMARY OF THE INVENTION

It is an object of the invention to provide a method and apparatus for treating meat products with ammonia without leaving the meat products with an undesirable ammonia odor or an undesirable flavor.

The treatment method according to the invention includes first applying ammonia to a meat product to produce an ammoniated meat product. The method then includes containing the ammoniated meat product in a treatment gas atmosphere which is either substantially free of ammonia gas or has a low ammonia gas content. A treatment vessel is used to contain the ammoniated meat product in the desired treatment gas atmosphere. Once the ammoniated meat product is contained in the appropriate treatment gas atmosphere, the method includes increasing the pressure of the treatment gas atmosphere to an operating pressure preferably greater than the vapor pressure of ammonia at the temperature of the ammoniated meat product being treated. This increased pressure is held on the ammoniated meat product for an operating period effective to reduce the amount of ammonia gas which escapes from the meat product after the product is placed again under atmospheric conditions, thus leaving the treated meat product with no significant ammonia odor.

It is important to note that the present ammonia treatment does not require any grinding or comminution of the meat product. The invention is therefore well suited for chunks or large cuts of meat and meat products. As used in this disclosure, the term "whole meat product" will be used to describe a chunk or large cut of either whole-muscle or formed meat product. It will be appreciated that a "whole meat product" under this definition may itself be formed from comminuted material. For example, a whole meat product under this definition may comprise a patty of ground or other comminuted meat, or may comprise a sausage or frankfurter made from a comminuted meat batter. Also, the phrase "whole meat product" is not intended to imply that the meat product includes only meat components. Rather, a whole meat product may be made up of meat components along with non meat additives or fillers.

Ammonia may be applied to the meat product in any suitable manner. For example, the meat product may be exposed to ammonia gas or sprayed with a solution of ammonia in water. The ammonia may be applied in a separate ammonia application device or vessel, or may be applied in a single vessel also used in applying the treatment gas pressure to the meat product. Regardless of how the ammonia is applied, the treatment gas atmosphere maintained during the pressurization step according to the invention should comprise an atmosphere or environment having a low ammonia gas content. That is, the ammonia gas content in the treatment gas atmosphere should be sufficiently low that the meat product will not become over-ammoniated during application of the treatment gas. The meat product would be over-ammoniated if it is left with an undesirable odor or taste after the treatment gas application. In order to prevent the meat product from becoming over-ammoniated, the partial pressure of ammonia gas in the treatment gas atmosphere of the operating pressure preferably remains below the vapor pressure of ammonia at the temperature of the meat product being treated, while the total pressure of the treatment gas atmosphere may be a pressure above the vapor pressure of ammonia at the temperature of the meat product being treated. A treatment gas atmosphere in which the ammonia content is sufficiently low to prevent the meat from becoming over-ammoniated during the treatment gas pressurization step will be referred to in this disclosure and the following claims as a substantially ammonia free atmosphere. A gas having an ammonia partial pressure below the vapor pressure of ammonia at the temperature of the meat product being treated is an example of a substantially ammonia free atmosphere.

Since pressurizing the ammoniated meat product in an atmosphere containing excessive ammonia gas could apply excessive ammonia to the meat product, the invention may include the step of removing excess ammonia gas from the treatment vessel prior to applying the treatment gas operating pressure. The ammonia gas to be removed may be left over from the ammonia application step in the treatment vessel or may be ammonia released from the meat product as it is being transferred to the treatment vessel. In any event, the step of removing ammonia gas from the treatment vessel may include injecting a purge gas into the treatment vessel to purge at least a portion of any ammonia gas from the treatment vessel through a suitable gas outlet opening in the vessel. This purging step may be performed either with or without first applying a vacuum within the treatment vessel. The purge gas may be substantially any gas suitable for use with the ammoniated meat product. Preferably, the gas used to purge the treatment vessel of excess ammonia may comprise the treatment gas under which the ammoniated meat product is pressurized to the operating pressure.

The operating pressure may be applied in any suitable fashion within the scope of the invention. For example, the treatment gas pressurization step may be performed by releasing pressurized treatment gas into the treatment vessel from a treatment gas supply. Alternatively, treatment gas may be compressed in the treatment vessel using a suitable piston and cylinder arrangement associated with the treatment vessel.

The treatment gas may be made up primarily of an inert gas or any suitable gas which does not chemically react with ammonia. Alternatively, the treatment gas may be or may include a neutralizing component which neutralizes ammonia or ammonium hydroxide. Carbon dioxide gas is an example of such a neutralizing gas component which may be included in the treatment gas. As yet another alternative, the treatment method may include a separate neutralization step between the ammonia application step and the treatment gas pressurization step. This neutralization step may comprise placing the ammoniated meat in a neutralizing gas atmosphere to neutralize at least a portion of the ammonia or ammonium hydroxide in the vessel or on the meat after the ammonia application step.

The invention may be used to provide a desired pH change in a meat product without having to comminute or grind the product. Most importantly, any significant ammonia odor is eliminated from the resulting ammoniated meat product.

These and other objects, advantages, and features of the invention will be apparent from the following description of the preferred embodiments, considered along with the accompanying drawings.

DESCRIPTION OF THE PREFERRED EMBODIMENTS

Figure 1:
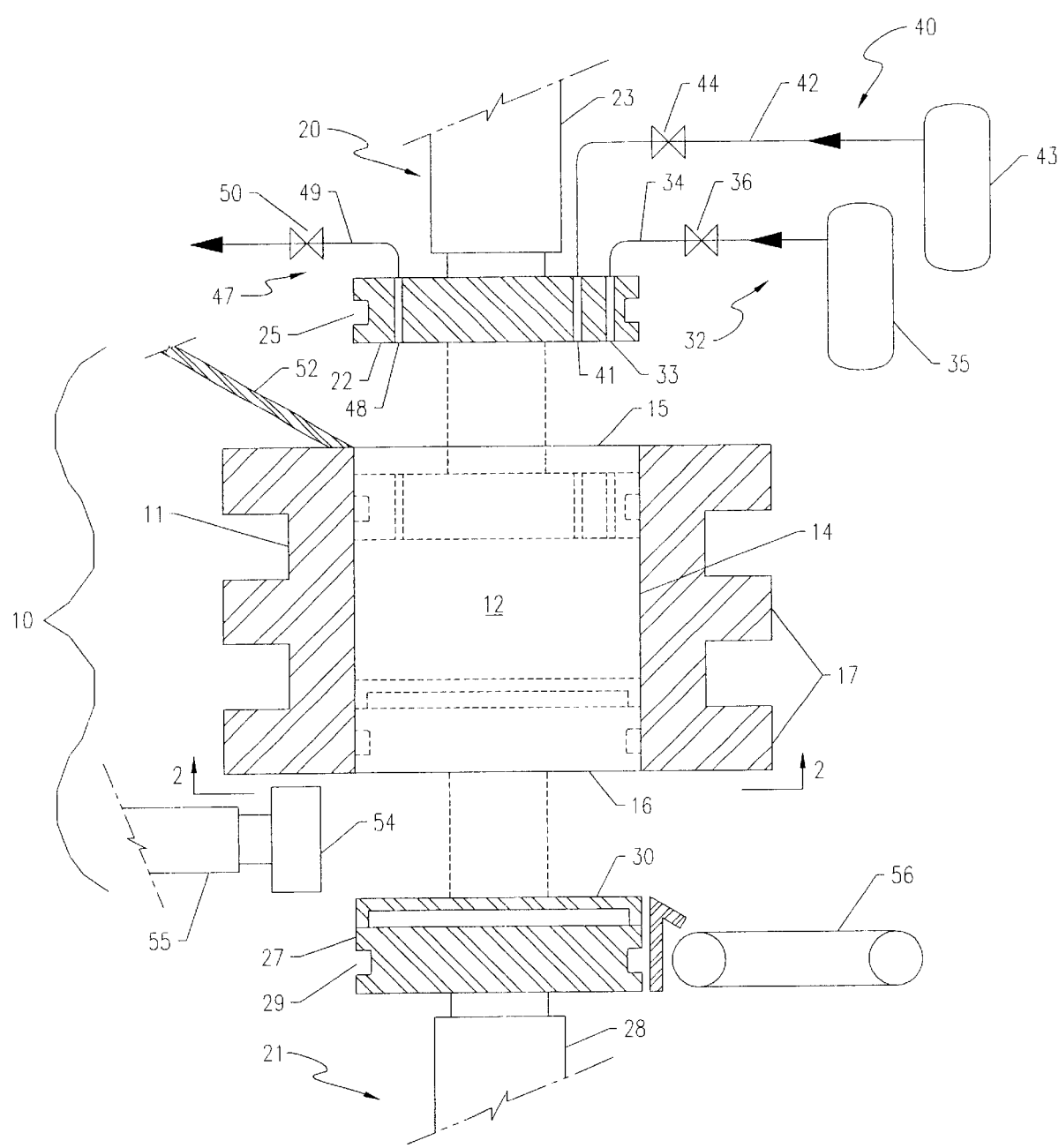
FIG. 1 is a somewhat diagrammatic section view of a meat product treatment apparatus embodying the principles of the invention.
Figure 2:
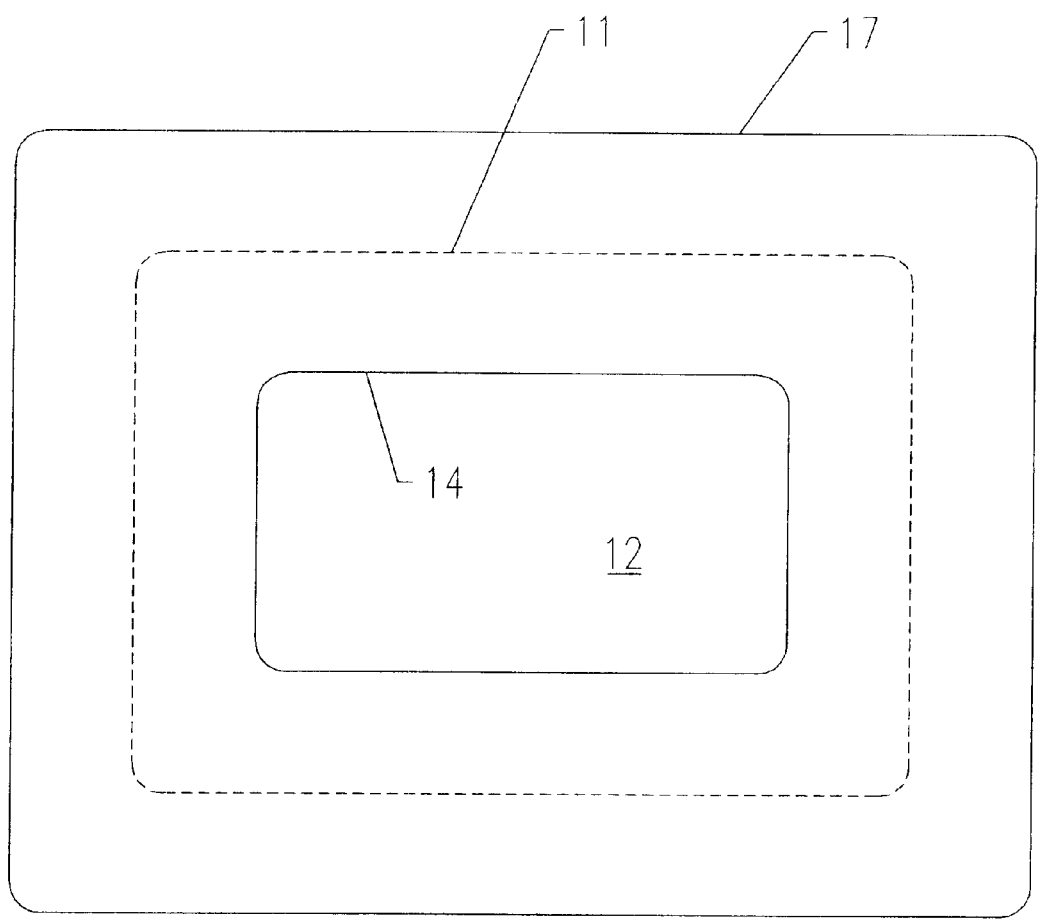
FIG. 2 is a bottom view of the vessel body shown in FIG. 1.

FIGS. 1 and 2 illustrate one preferred form of treatment apparatus 10 embodying the principles of the invention. Treatment apparatus 10 includes a vessel body 11 having a vessel interior volume 12 defined by vessel inner walls 14 and an upper opening 15 and a lower opening 16. Upper opening 15 forms an inlet through which meat products to be treated may be introduced into the vessel interior 12, while lower opening 16 forms an outlet trough which treated material may be removed from the vessel interior. The illustrated vessel body has a rectangular cross-section with reinforcing ribs 17 spaced apart along the length of the vessel body for allowing the vessel body to withstand higher operating pressures. It will be appreciated, however, that the vessel body may be cylindrical or any other suitable shape within the scope of the invention, and may be constructed without reinforcing ribs. Regardless of the shape of the vessel body, it may be made of any material suitable for use in food processing applications and capable of withstanding the operating pressures described further below. For example, the vessel body 11 may be made of stainless-steel.

The vessel body 11 is shown in FIG. 1 oriented with the longitudinal axis of the vessel interior 12 extending vertically. This orientation is desirable since it allows the vessel to be loaded by gravity feed as will be discussed below. However, the vessel may be oriented differently within the scope of the invention and the following claims. Regardless of the orientation of the vessel body, it will be appreciated that the vessel body is supported in the desired orientation by a suitable support structure. The vessel body support structure is omitted from FIGS. 1 and 2 so as not to obscure the invention in unnecessary detail.

The illustrated single vessel treatment apparatus includes an upper piston and actuator arrangement shown generally at reference numeral 20, and a lower piston and actuator arrangement shown generally at reference numeral 21. The upper piston and actuator arrangement 20 includes an upper piston 22 and an upper actuator 23. Actuator 23 is preferably hydraulically operated to move upper piston 22 between a retracted position shown in solid lines in FIG. 1 and an extended position shown in phantom lines. When extended through upper opening 15 into the vessel interior 12, the peripheral surface of upper piston 22 is adapted to form a seal with the inner walls 14. The preferred form of the invention includes a sealing element 25 formed from a suitable seal material extending around the periphery of the upper piston 22 to provide a good seal between the upper piston and the vessel inner walls 14.

The lower piston and actuator arrangement 21 includes a lower piston 27 and a lower actuator 28. Lower actuator 28 is also preferably hydraulically driven and is adapted to move lower piston 27 between a retracted position shown in solid lines in FIG. 1 and an extended a position shown in phantom lines. Similarly to the seal 25 shown with upper piston 22, lower piston 27 also includes a sealing element 29 for providing a good seal between the periphery of the lower piston 27 and the inner vessel walls 14. Also, lower piston 27 includes an upper grate or perforated plate 30 spaced apart from the remainder of the piston. Grate 30 includes openings or perforations (not shown due to the scale of the figure) which allow the atmosphere within the vessel to reach the space 31 between the grate and the remainder of the lower piston 27. This space 31 and the perforations allow the gas pressure in vessel interior 12 to reach the lower surface of the meat product being treated, that as, the surface of the meat product contacting the grate 30 on top of lower piston 27. Thus, the gas pressure is applied substantially evenly around the entire surface area of the meat product being treated within the vessel as will be discussed further below.

The apparatus further includes an ammonia application arrangement shown generally at reference numeral 32. The illustrated ammonia application arrangement is associated with upper piston 22 and includes an ammonia inlet port 33 formed in the upper piston. An ammonia conduit 34 connects ammonia inlet port 33 to an ammonia supply 35. A suitable control valve arrangement with at least one control valve 36 is included in the ammonia application arrangement for controlling the flow of ammonia into vessel interior 12. Ammonia supply 35 is illustrated diagrammatically in FIG. 1 as a vessel which may contain pressurized ammonia in gas or liquid form. Although not specifically shown in the figure, it will be appreciated that the various pressure reduction devices and valving may be associated with the ammonia supply for providing the desired ammonia to the vessel interior as described below. The ammonia supply may alternatively comprise a vessel containing ammonia in solution with water. This solution may be sprayed into the vessel interior to produce the ammoniated meat product according to the invention.

Treatment apparatus, 10 further includes a treatment gas application arrangement and a vessel purging arrangement. The treatment gas application arrangement is shown generally at reference numeral 40 and includes a treatment gas inlet port 41 formed in upper piston 22. A treatment gas conduit 42 connects port 41 to a treatment gas supply shown at reference numeral 43. A suitable treatment gas control valve 44 is included in the treatment gas application arrangement for controlling the flow of treatment gas into vessel interior 12. Treatment gas supply 43 may comprise a vessel containing a suitable treatment gas. This treatment gas may be any type of gas which does not substantially chemically react with the ammoniated meat product or leave an undesirable residue in the meat product after contact according to the invention. For example, the treatment gas may comprise air, nitrogen, oxygen, or any inert gas. The treatment gas may also include a neutralizing component, such as Carbon dioxide gas for example, which chemically reacts with ammonia and ammonium hydroxide. Where the neutralizing gas is applied in a step separate from the treatment gas step as will be discussed further below, the treatment apparatus includes a separate neutralizing gas supply and conduit, inlet port, and control valve arrangement similar to the treatment gas application arrangement shown in FIG. 1.

The vessel purging arrangement shown at reference numeral 47 in FIG. 1 includes a purge port 48 in upper piston 22 connected to a purge conduit 49. A purge control valve 50 is included in the arrangement for controlling the flow of gas through conduit 49.

Treatment apparatus 10 also includes equipment for feeding meat products to be treated into the vessel interior 12 and for removing treated meat products from the vessel. The preferred feed arrangement comprises a feed chute 52 positioned at one side of the vessel body 11 and terminating at upper opening 15 of the vessel body. Feed chute 52 is positioned to direct meat products to be treated into the vessel interior 12 through upper opening 15.

The illustrated product removal arrangement includes a removal piston 54, an actuator 55, and a conveyor 56. Removal actuator 55 is adapted to move removal piston 54 from the retracted position shown in FIG. 1 across the upper surface of lower piston 27 to an extended position. The movement of removal piston 54 over the upper surface of lower piston 27 pushes treated products from the lower piston onto conveyor 56. Conveyor 56 then conveys the treated meat products to additional processing equipment such as packaging equipment for example.

The method according to the invention may be described with reference to the flow chart shown in FIG. 3 along with the apparatus shown in FIG. 1. The flow chart shows the basic process steps according to the invention and also steps specific to the apparatus 10 shown in FIG. 1. As shown at block 60 in FIG. 3, the first basic step according to the invention comprises applying ammonia to a meat product to be treated to produce an ammoniated meat product. After producing the ammoniated meat product, the process includes containing the ammoniated meat product in a treatment gas atmosphere as indicated that process block 61 in FIG. 3. This treatment gas atmosphere comprises an atmosphere which is essentially free of ammonia gas or at least contains a minimal ammonia gas content. The final basic step according to the invention is shown at process block 62 in FIG. 3 and comprises increasing the pressure of the treatment gas atmosphere to an operating pressure and then holding that pressure for an operating period. The operating pressure is preferably a pressure greater than the vapor pressure of ammonia at the temperature of the meat product being treated. The operating period is a period of time sufficient to reduce the ammonia odor in the resulting treated meat product.

The treatment process according to the invention is useful for ammoniated meat products having a pH at the surface of the material of up to at least 10.5 as measured with a field pH meter. Also, for a given ammoniated meat product, the higher the operating pressure, the lower the operating period required to produce the desired effect of reducing or eliminating the ammonia odor in the treated meat product. For low operating pressures such as 5 psig and a meat product at 32 to 40 degrees Fahrenheit, the operating period may be approximately 3 to 5 minutes or more. However, for operating pressures at or above the vapor pressure for ammonia gas at the temperature of the meat product, the operating period may be as little as 1 to 5 seconds. Also, the higher the pH of the ammoniated meat product being treated, the higher the operating period required to produce the desired effect.

The preferred process performed by the apparatus shown in FIGS. 1 and 2 includes first readying apparatus 10 to receive the meat product to be treated. This step is shown at process block 64 in FIG. 3 and comprises placing lower piston 27 in the extended position shown in phantom lines in FIG. 1, and placing upper piston 22 in the retracted position shown in solid lines. In this initial position, the vessel walls 14 and the upper surface of lower piston 27 define a container. The upper opening 15 of vessel body 12 remains exposed so that the meat product to be treated may be placed in the container preferably by sliding down feed chute 52. In this initial position, meat products such as beef steaks, pork, poultry, or fish, formed meat products such as patties formed from comminuted meat or such as sausage formed from a comminuted meat batter, or even whole sections of an animal carcass may be placed in the interior 12 of vessel body 11. Loading the treatment vessel is shown as step 65 in FIG. 3.

Figure 3:
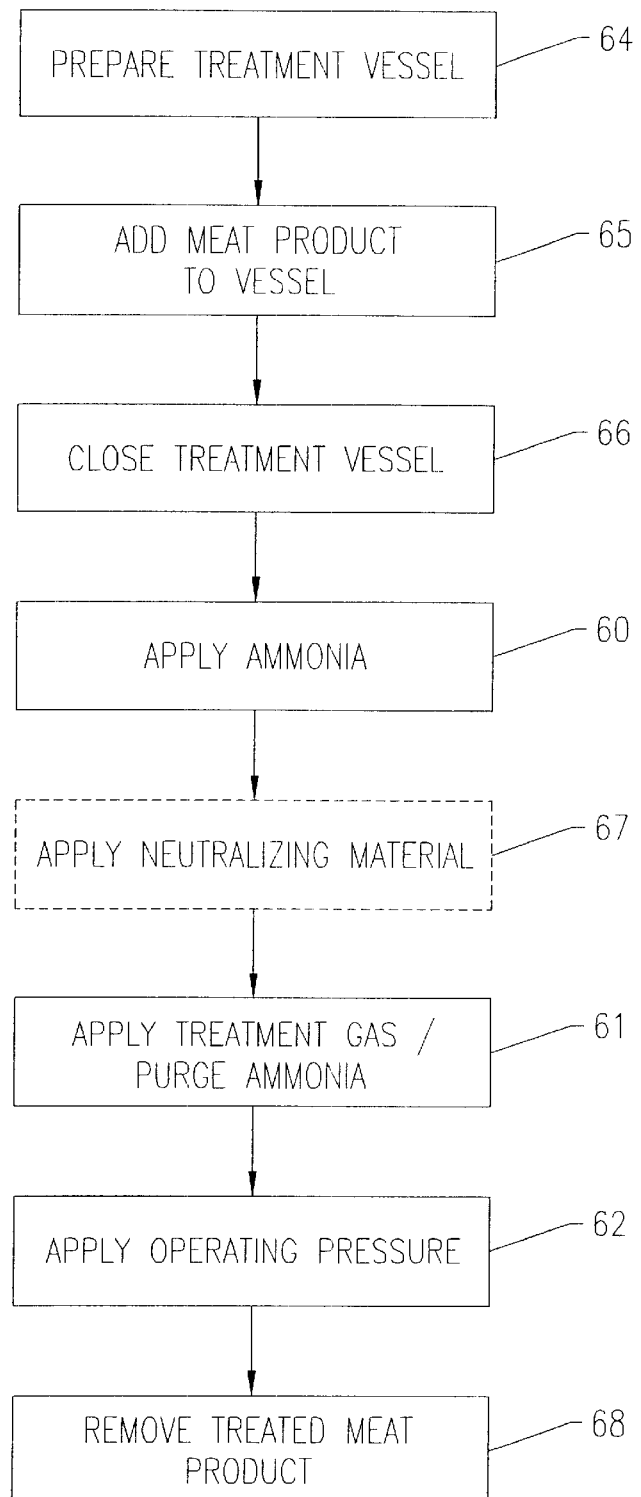
FIG. 3 is a flow chart showing the method steps according to the invention.

Once loaded with the meat product or products to be treated, the interior 12 of the vessel body is sealed as indicated at process block 66 in FIG. 3. This step is performed in the illustrated apparatus by lowering upper piston 22 to an extended position in which it extends through the upper vessel body opening 15 to form a seal with the vessel inner walls 14. This extended position of upper piston 22 is shown in dashed lines in FIG. 1.

With the vessel loaded with meat product to be treated and sealed with the upper and lower pistons, 22 and 27 respectively, the preferred ammonia application step (step 60 in FIG. 3) comprises injecting ammonia through the ammonia inlet port 33 included in upper piston 22. The ammonia is applied to the meat product preferably under an elevated pressure and preferably a pressure over the vapor pressure of ammonia at the temperature of the meat product being treated. This elevated pressure may be achieved by the pressure of the ammonia gas from the ammonia gas supply or by pressurizing the ammonia once in the sealed area in vessel interior 12. The pressurizing step may be performed in the illustrated form of the invention by moving one o;r both the upper piston 22 or lower piston 27 relatively closer together to decrease the effective volume within vessel interior 12.

After ammonia is applied to the meat product to produce the desired ammoniated meat product at process block 60 in FIG. 3, the invention includes the step of containing the ammoniated meat product In a treatment gas atmosphere as discussed above with reference to process block 61. Since the apparatus 10 shown in FIGS. 1 and 2 performs this method step in the same vessel used to apply the ammonia, the step of containing the ammoniated meat product in a treatment gas atmosphere in this form of the invention includes the step of purging ammonia from the vessel interior 12. This ammonia purging step is accomplished by injecting treatment gas through treatment gas port 41 while opening purge control valve 50 to allow ammonia gas to be displaced through purge port 48 and conduit 49. The ammonia purging step may also include applying a vacuum to the vessel to draw out ammonia prior to injecting the purging gas. Ammonia gas remaining after the ammoniating step may be purged to produce a substantially ammonia free treatment gas atmosphere within vessel interior 12. It will be appreciated that some ammonia gas will remain in the vessel. However, the atmosphere within the vessel will contain only a small fraction of ammonia gas and this small amount will not diminish the effectiveness of the treatment according to the invention. In particular, the partial pressure of the small amount of ammonia gas remaining in vessel interior 12 may be below the vapor pressure of ammonia at the temperature of the meat product being treated, while the total gas pressure in the vessel interior due to the other gas or gasses making up the treatment gas may be over the vapor pressure of ammonia at the temperature of the meat product.

Alternatively to applying the treatment gas immediately after the ammonia application step, the method may include a separate neutralizing step as shown at process box 67 in FIG. 3. This neutralizing step includes applying a neutralizing gas such as Carbon dioxide gas or other neutralizing material to chemically react with ammonia and ammonium hydroxide on the ammoniated meat or in the treatment vessel. The neutralizing gas is preferably applied under an elevated pressure in a suitable vessel such as the treatment vessel shown in FIG. 1.

Whether the method includes a separate neutralization step prior to applying the treatment gas or not, the step performed after applying the treatment gas is shown at process block 62 in FIG. 3 and, as discussed above, comprises the step of applying the operating pressure. In the apparatus shown in FIG. 1, the operating pressure may be developed by relying on the pressure of the injected treatment gas from treatment gas supply 43. Alternatively, the operating pressure in the vessel interior 12 may be produced by moving one or both the upper piston 22 or lower piston 27 relatively closer together to reduce the effective volume of the vessel interior 12 and thereby increase the pressure within the vessel interior. In either case the purge control valve 50 is preferably closed to prevent the flow of gas from the vessel.

The final step in the treatment process illustrated in FIG. 3 comprises removing the treated meat product from the vessel as shown at process block 68. In the preferred form of the invention shown in FIG. 1, this treated product removal step includes first lowering lower piston 27 to the retracted position shown in solid lines. Once lower piston 27 is in the retracted position, removal piston 54 may be extended across the upper surface of lower piston 27 to push the treated meat product onto conveyor 56. Conveyor 56 then transports the treated meat product to further processing stations such as a packaging station for example.

It is believed that applying the operating pressure in an appropriate ammonia-free atmosphere causes the previously applied ammonia on the meat product to better bind with the meat product so that once the pressure is removed, the ammonia will remain in the meat product. That is, once the operating pressure is applied to the ammoniated meat product for a sufficient operating period, the treated meat product will not emit a substantial ammonia odor, or will emit an odor significantly less than a similar untreated ammoniated meat product.

Although the single-vessel treatment apparatus 10 shown in FIGS. 1 and 2 comprises one preferred form of treatment apparatus for performing the treatment method according to the invention, the invention is by no means limited to this particular apparatus. Multiple vessels or vessels including multiple compartments may also be employed to perform the treatment steps required by the invention. For example, two of the devices shown in FIG. 1 may be used together to perform the desired steps. In this case, a first vessel would be used to apply ammonia to produce the desired ammoniated meat product and a second vessel would receive ammoniated meat products from the first vessel. The second vessel would perform the steps of containing the ammoniated meat product in the desired treatment gas atmosphere and applying the operating pressure. This multiple-vessel apparatus for performing the treatment method may not require an ammonia purging step since the ammonia and treatment gas are applied in separate vessels.

Another alternative apparatus for treating meat products according to the present invention includes a generally cylindrical vessel divided into multiple compartments by a carousel structure mounted in the vessel. The cylindrical vessel has a series of treatment stations positioned at different angular orientations around its periphery. For example, the device may include an inlet station, an ammonia application station, a neutralizing station, a treatment gas application station, a treatment pressurization station, and finally an outlet station. A meat product may be loaded into a compartment of the carousel and then the carousel may be rotated within the cylinder to carry the meat product from station to station. The various operations according to the present treatment method are performed at the respective stations.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A method for treating meat products with ammonia, the method including the steps of:
   (a) applying ammonia to a meat product to produce an ammoniated meat product;
   (b) containing the ammoniated meat product in a substantially ammonia free treatment gas atmosphere within a vessel; and
   (c) increasing the pressure of the treatment gas atmosphere to an operating pressure for an operating period sufficient to reduce an ammonia odor in the meat product after the meat product is removed from the vessel.

2. The method of claim 1 wherein the operating pressure is a pressure greater than the vapor pressure of ammonia at the temperature of the meat product.

3. The method of claim 1 wherein the step of applying ammonia to the meat product includes placing the meat product in an atmosphere of ammonia gas.

4. The method of claim 1 wherein the step of applying ammonia to the meat product includes applying an ammonia/water solution to the meat product.

5. The method of claim 1 wherein the step of containing the ammoniated meat product in the treatment gas atmosphere is performed in a treatment vessel and includes the step of:
   (a) removing ammonia gas from the treatment vessel.

6. The method of claim 5 wherein the step of removing ammonia gas from the treatment vessel includes:
   (a) injecting a treatment gas into the treatment vessel to purge at least a portion of any ammonia gas residing in the treatment vessel.

7. The method of claim 1 further including the step of:
   (a) applying a neutralizing material to the ammoniated meat product.

8. A method for treating whole meat products with ammonia, the method including the steps of:
   (a) applying ammonia to a whole meat product to produce an ammoniated whole meat product;
   (b) containing the ammoniated whole meat product in a treatment vessel;
   (c) developing a substantially ammonia free treatment gas atmosphere in the treatment vessel; and
   (d) increasing the pressure of the treatment gas atmosphere in the treatment vessel to an operating pressure for an operating period sufficient to reduce an ammonia odor in the whole meat product after the meat product is removed from the vessel.

9. The method of claim 8 wherein the operating pressure is a pressure greater than the vapor pressure of ammonia at the temperature of the ammoniated whole meat product within the vessel.

10. The method of claim 8 wherein the step of applying ammonia to the whole meat product includes placing the whole meat product in an atmosphere of ammonia gas.

11. The method of claim 8 wherein the step of applying ammonia to the whole meat product includes applying an ammonia/water solution to the whole meat product.

12. The method of claim 8 wherein the step of developing the treatment gas atmosphere in the treatment vessel includes:
   (a) injecting treatment gas into the treatment vessel to displace at least a portion of any ammonia gas residing in the treatment vessel after containing the ammoniated whole meat product in the treatment vessel.

13. The method of claim 8 wherein the step of increasing the pressure of the treatment gas atmosphere in the treatment vessel comprises:
   (a) releasing treatment gas into the treatment vessel from a pressurized treatment gas supply.

14. The method of claim 8 wherein the step of increasing the pressure of the treatment gas atmosphere in the treatment vessel comprises:
   (a) moving a piston associated with the treatment vessel to decrease the effective volume of the treatment vessel.

15. The method of claim 8 wherein the treatment gas atmosphere includes a neutralizing gas.

16. A method for treating meat products with ammonia, the method including the steps of:
   (a) applying ammonia to a meat product to produce an ammoniated meat product;
   (b) placing the ammoniated meat product in a substantially ammonia free treatment gas atmosphere; and
   (c) increasing the pressure of the treatment gas atmosphere to an operating pressure greater than the vapor pressure of ammonia at the temperature of the meat product for an operating period of at least one second.

17. The method of claim 16 wherein the step of applying ammonia to the meat product includes placing the meat product in an atmosphere of ammonia gas.

18. The method of claim 16 wherein the step of applying ammonia to the meat product includes applying an ammonia/water solution to the meat product.

19. The method of claim 16 wherein the step of placing the ammoniated meat product in the treatment gas atmosphere is performed in a treatment vessel and further including the step of removing ammonia gas from the treatment vessel to produce the substantially ammonia free treatment gas atmosphere.

20. The method of claim 19 wherein the step of removing ammonia gas from the treatment vessel includes injecting a purge gas into the treatment vessel.

* * * * *